United States Patent [19]

Welty

[11] Patent Number: 4,599,494

[45] Date of Patent: Jul. 8, 1986

[54] RING SENSE TELEPHONE TONE RINGER CIRCUIT

[75] Inventor: Dennis L. Welty, Mesa, Ariz.

[73] Assignee: Motorola, Inc., Schaumburg, Ill.

[21] Appl. No.: 656,199

[22] Filed: Oct. 10, 1984

[51] Int. Cl.$^4$ ............................................. H04M 1/00
[52] U.S. Cl. ................................. 179/84 T; 307/362; 179/84 R
[58] Field of Search ................ 179/84 T, 84 R, 81 R; 307/362, 130; 323/315

[56] References Cited

U.S. PATENT DOCUMENTS 4,292,604 9/1981 Embree et al. ................ 179/84 T X
4,447,675 5/1984 Arntsen et al. ................... 179/84 R Primary Examiner—James L. Dwyer
Attorney, Agent, or Firm—Michael D. Bingham

[57] ABSTRACT

A sense circuit which senses when the magnitude of a full wave rectified current exceeds a predetermined threshold value comprises current mirrors for diverting a very small portion of the current to an output wherein this current is filtered to produce a direct current (dc) voltage. The magnitude of the dc voltage varies directly with the magnitude of the rectified current. The dc voltage is compared with a reference voltage to produce an output signal when the magnitude of the reference voltage is exceeded.

13 Claims, 2 Drawing Figures

RING SENSE TELEPHONE TONE RINGER CIRCUIT

BACKGROUND OF THE INVENTION

The present invention relates to sense circuits and, more particularly, to a circuit for sensing when an input signal exceeds a predetermined amplitude for producing an output signal indicative thereof. Specifically, the present invention pertains to ring signal detection circuit for use with electronic telephone tone ringer circuits to sense when a ringing signal is present on the telephone line to enable the electronic telephone tone ringer circuit to produce a simulated ringing tone.

The functions of contemporary telephones are being replaced by use of integrated circuitry. One such function that is being replaced by a solid state circuit is the telephone bell ringer. For instance, the MC34012 is a solid state Telephone Tone Ringer Circuit manufactured by Motorola, Inc. using bipolar linear integrated injection logic (I2L) technology. The MC34012 replaces the bell ringer and its companion bulky transformer circuitry of conventional telephone while simulating the ringing of the bell in response to the AC bell ringing signal applied to the Tip and Ring inputs of the telephone.

The MC34012 Telephone Tone Ringer Circuit includes circuitry for rectifying the AC bell ringing signal appearing on the Tip and Ring terminals and sensing the amplitude of the ringing signal for enabling tone generation circuitry therein to produce a tone ringer output signal as is understood. The tone generation circuitry comprises an output buffer amplifier that drives a piezo sound element. The MC34012 is packaged in an 8 leaded dual-line plastic package assembly: a very economical package.

Although the prior art circuit functions quite well, there has been found a need for a more powerful telephone tone ringer circuit, i.e., one that can provide more drive to the piezo sound element to thereby increase the amplitude of the ringing tone. It is also desired, in order to maintain cost at a minimum, to use the small 8 leaded plastic package presently being used in the assembly of the MC34012. However, to modify the MC34012 in order to produce a more powerful output signal requires the existing buffer amplifier to be modified to have push-pull outputs to double the available output voltage supplied at the outputs of the circuit. However, push-pull outputs require an additional output pin and therefore the existing 8 leaded plastic package could otherwise not be utilized since the MC34012 already requires use of 8 leads. Therefore, modification of the existing telephone tone ringer circuit is required.

Hence, there exists a need for an improved telephone ringer integrated circuit which can produce a more powerful output tone signal while requiring a minimum number of outputs in order to minimize production cost.

SUMMARY OF THE INVENTION

Accordingly, it is an object of the present invention to provide an improved sense circuit for sensing when the amplitude of an applied signal exceeds a predetermined magnitude.

It is another object of the present invention to provide an improved sense circuit for sensing when the amplitude of an applied signal exceeds a predetermined magnitude and for producing a signal on the occurrence thereof.

Another object of the present invention is to provide an improved tone ringer signal detection circuit.

Still another object of the present invention is to provide an improved telephone tone ringer circuit.

A further object of the present invention is to provide an integrated telephone tone ringer circuit including improved tone ringer detection circuitry.

In accordance with the above and other objects there is provided an amplitude sensing circuit which senses when an applied input signal exceeds a predetermined threshold value for producing an output signal at the occurrence thereof, the sensing circuit includes current mirror circuitry response to the applied input signal for producing an output current the magnitude of which is proportional to the magnitude of the current of the applied input signal; load circuitry coupled to the current mirror circuitry for producing a voltage having a magnitude which is related to the magnitude of the output current produced at the output of the current mirror circuitry and a threshold comparator for comparing the magnitude of the voltage produced by the circuitry with a reference voltage to produce the output signal, wherein the output signal is indicative of the amplitude of the applied input signal exceeding the predetermined threshold value.

DETAILED DESCRIPTION OF THE PREFERRED EMBODIMENT

Figure 1:
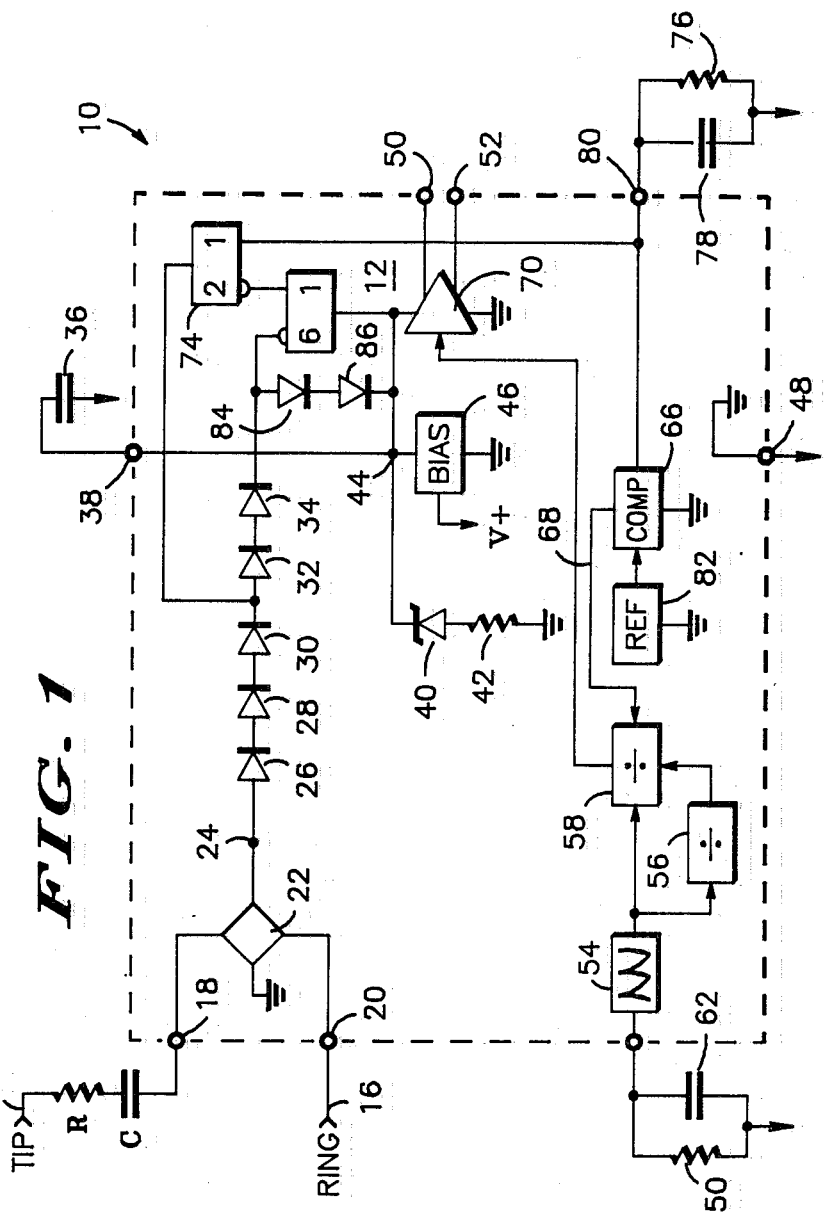
FIG. 1 is a partial block and schematic diagram of a telephone tone ringer circuit including an amplitude sense circuit of the preferred embodiment.

Referring to FIG. 1 there is illustrated a general block and schematic diagram of telephone tone ringer circuit 10 including improved amplitude sensing circuit 12 of the preferred embodiment. The overall function and operation of telephone tone ringer circuit 10 is understood to those skilled in the art. For example, the aforementioned MC34012 integrated tone ringer circuit provides the function of ringer circuit 10 including sensing circuitry for sensing the magnitude of an applied AC ringing signal that is supplied acrossed Tip and Ring terminals 14 and 16 from the central telephone office equipment. However, what is considered novel, is improved sensing circuit 12 and its function in conjunction with the operation of the other known circuitry comprising ringer circuit 10. It is understood that ringer circuit 10 is suited to be fabricated in integrated circuit form utilizing bipolar integrated injection logic (I2L).

The AC ringing signal is supplied over the telephone lines to the telephone thru resistor R and capacitor C to the inputs 18 and 20 of ringer circuit 10. Typically, the AC ringing signal is at a frequency of 20 Hertz and has a maximum voltage amplitude of 90 volts RMS. However, the amplitude of the ringing signal varies accordingly with the amount of line resistance and distance that the telephone is away from the telephone equipment. The AC ringing signal is rectified by full wave diode bridge rectifier 22 to produce a full wave rectified pulsating input voltage at node 24. A pulsating current is therefore sourced through series connected diodes 26, 28, 30, 32 and 34. The rectified AC current signal is filtered by capacitor 36 connected at input 38 to ringer circuit 10 and in conjunction with zener diode 40 and resistor 42 provides the high power supply voltage for the circuit at node 44. This filtered voltage is also utilized to drive bias circuit 46 which derives the power supply for the power supply voltage V+ which is used to drive internal circuitry. Internal circuit ground reference of ringer circuit 10 is provided at terminal 48 to the system ground reference. The power supply is utilized to activate tone generation circuitry that drives a piezo sound element which is coupled externally to ringer circuit 10 at outputs 50 and 52 thereof. The tone generation circuitry includes relaxation oscillator 54 and frequency dividers 56 and 58 which produce high and low frequency tones as well as a tone warble frequency in order to simulate the bell ringer that is found in conventional telephone hand sets as is understood. The frequency of relaxation oscillator 54 is determined by resistor 60 and capacitor 62 which are coupled in parallel at input pin 64 of ringer circuit 10 and to the oscillator circuitry comprising oscillator 54.

When enabled by comparator circuit 66, via input lead 68, the divider circuits 56 and 58 are cyclically switched to provide the simulated ringing tone at outputs 50 and 52, the push-pull outputs of buffer amplifier 70. Amplifier 70 is driven by divider 58. The frequency of the tone ringer output signal appearing at outputs 50 and 52 alternates between the high frequency (F1) and the low frequency (F2) at the warble frequency rate which is determined by divider 56 as is well understood. As will be more fully explained, when the amplitude of the AC ringing signal applied across Tip and Ring terminals 14 and 16 exceeds a predetermined threshold value, sense circuit 12 will enable the tone generation circuitry by causing the output state of comparator 66 to switch which enables gate circuitry in divider 58. When the AC ringing signal is terminated, the output of comparator 66 will be caused to switch states again to disable divider 58 and, hence, the tone generation circuitry. The foregoing described function and operation of ringer circuit 10 is well understood and is provided by the MC34017 telephone ringer circuit.

Signal detection circuit 12 of the present invention activates the tone generation circuitry in a novel manner. The tone generation circuitry is activated whenever the AC ringing voltage supplied across Tip and Ring terminals 14 and 16 exceed a predetermined threshold level as will now be explained. A current proportional to the fullwave rectified voltage developed across diode bridge 22 is conducted through diodes 26 through 34. Current mirrors 72 and 74 divert a small portion of the current sourced to the diodes to threshold comparator 66. This full wave rectified current produces a voltage across resistor 76 which is filtered by capacitor 78 that is coupled in parallel with resistor 76 at input 80. The filtered voltage is supplied to one input of comparator 66 and is compared to reference voltage VREF supplied at another input of the comparator from reference voltage circuit 82. When the filtered voltage across capacitor 78, which is referenced to ground, exceeds the referenced voltage, the output state of comparator 66 switches to an output state to produce an enabling signal to divider 58 as aforedescribed. Diodes 84 and 86 which are coupled in parallel with current mirror 72 provide protection by limiting the maximum current that can be conducted through current mirror 72.

Figure 2:
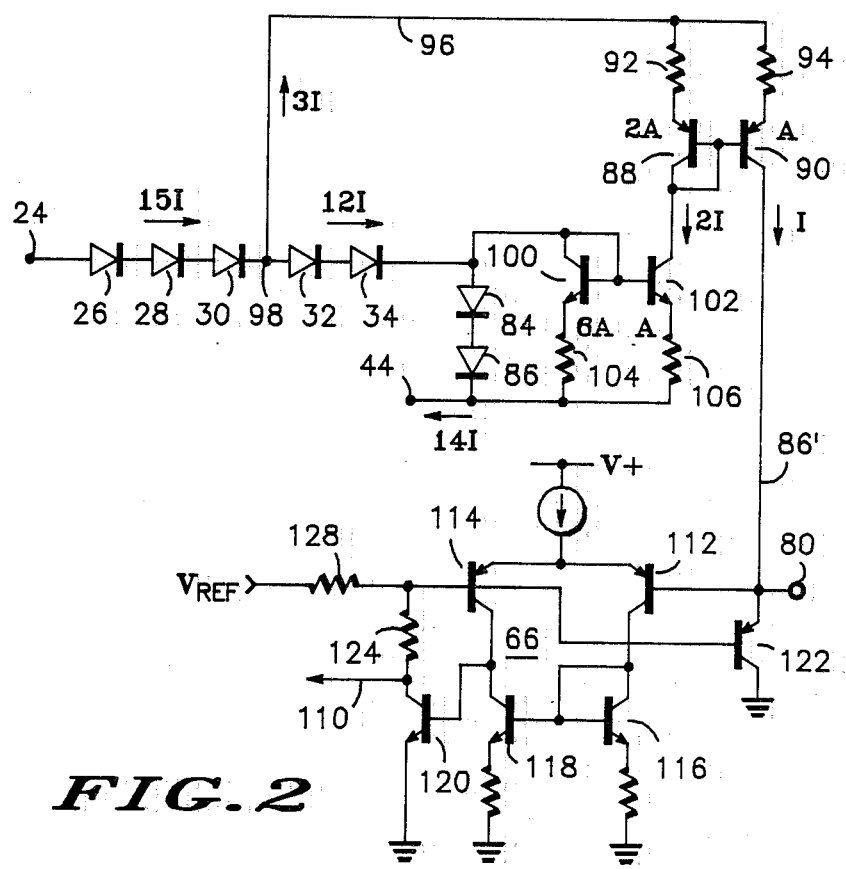
FIG. 2 is a schematic diagram of the sense circuit of FIG. 1.

Turning now to FIG. 2, the detailed description and operation of sensing circuit 12 in conjunction with threshold comparator 66 is now explained. It is understood that components in FIG. 2 corresponding to like components in FIG. 1 are designated by the same reference numerals. Further, for explanation purposes, a fullwave rectified current equal to 15I is assumed to flow through diodes 26, 28, and 30. However, it is to be understood that any proportional amount of current can be realized as well as any current ratioing aspect between current mirror 72 and 74 which is to be described. Thus, the current of value I, which is equal to 1/15 of the total current sourced to node 24, is sourced at the output of current mirror 74 via lead 86' to terminal 80. Current mirror 74 is illustrated as including an input (indicated by the semicircle in FIG. 1) corresponding to the collector of PNP transistor 88. Transistor 88 is connected as a semiconductor diode by having its collector coupled to its base. The base of transistor 88 is also coupled to the base of PNP transistor 90 the collector of which corresponds to the output of current mirror 74. The emitters of transistors 88 and 90 are returned through respective resistors 92 and 94 to a common terminal of current mirror 74. The common terminal is returned via lead 96 to the interconnection point between diodes 30 and 32. Diode connected transistor 88 and transistor 90 form a well known PNP current mirror circuit wherein the magnitude of the output current flowing at the output, i.e., the collector of transistor 90 can be made proportional to the current flowing at the input from the collector of transistor 88. As illustrated, the area of the emitter of transistor 88 is made twice as large as the emitter of transistor 90. Thus, the magnitude of the output current of current mirror 74 that is sourced to terminal 80 is equal to ½ the current flowing at the input of the current mirror. Therefore, if it assumed that the output current from current mirror 74 is equal to I, the input current flowing at the input of the current mirror is equal to 2I. Thus, a current of value 3I must be supplied at the common terminal from node 98. A current of value 12I flows through diodes 32 and 34 to the input of current mirror 72. Current mirror 72 is a well known NPN type current mirror circuit which includes diode connected NPN transistor 100 having its base coupled to its collector to diode 34 as well as to the base of NPN transistor 102. The emitters of transistors 100 and 102 are coupled to node 44 at the common terminal of current mirror 72 through respective resistors 104 and 106. In a like manner, as has been described above with respect to current mirror 74, by area ratioing the emitters of transistor 100 and 102 the output current of current mirror 72 flowing at the output of transistor 102 is made proportional to the input current to the current mirror flowing into the collector of transistor 100. For an example, if the emitter area of transistor 100 is made six times larger than the emitter area of transistor 102 then the current flowing through transistor 100 will be six times the current flowing in transistor 102. Hence, with a current of 12I sourced to the input of current mirror 72 and output current of 2I is produced at the output thereof with this current being sourced from current mirror 74 as described above. It is understood that any proportional mirroring factor could be used for current mirror 72 and 74 by changing the emitter area ratioing factor between respective transistors 100, 102 and 88, 90. Therefore, as has been mentioned, the current sourced at terminal 80 is equal to 1/15th of the magnitude of the fullwave rectified current sourced to node 24 and further the current sourced to node 44 from the common terminal of current mirror 72 is therefore equal to 14/15ths of the current sourced to node 24. Hence, a small portion of the total full wave rectified current flowing through diodes 24 through 30 is diverted by current mirror 72 and 74 (which in combination are designated current mirror means) to the input of comparator 66 with the remainder of the current being utilized to charge filter capacitor 36 in order to derive the high current power supply. Diodes 84 and 86 which are coupled between the collector of transistor 100 and terminal 44 limit the maximum current that can flow through transistor 100. Since the voltage between the collector of transistor 100 and node 44 can be at a maximum of two forward diode voltage drops and with the base to emitter diode of transistor 100 being equal to one forward diode voltage drop, there is a one diode voltage drop potential applied across resistor 104. Hence, the maximum current conducted through transistor 100 is equal to the value of one diode voltage drop divided by the resistance value of resistor 104.

As long as the AC ringing signal applied to Tip and Ring terminals 14 and 16 is less than a predetermined voltage level, the magnitude of the full wave rectified current will produce a proportional current sourced to terminal 80 which when filtered by capacitor 78 produces a voltage across resistor 76 that will be less than the magnitude of the reference voltage VREF. In this condition, the output 110 of threshold comparator 66 is in a first state which produces a disabling output signal to divider 58 as described above. Thus, PNP transistor 112 is fully conducting and PNP transistor 114 is essentially nonconducting. Diode connected transistor 116 is therefore conducting and transistor 118 is in a saturated condition maintaining transistor 120 in a nonconducting state. Because transistor 120 is nonconducting the base of transistor 114 is at the potential of VREF. Transistor 122 is therefore also nonconducting as its base-emitter is reversed bias. However, when the amplitude of the AC ringing signal exceeds the predetermined threshold level the voltage developed at terminal 80 increases and exceeds the reference voltage applied to the base of transistor 114 and the output state of comparator 66 changes. In this state, transistor 112 becomes nonconducting whereas transistor 114 becomes conducting to source base current drive to transistor 120. Transistor 120 will then be turned on and becomes saturated due to resistor 124 limiting the amount of current that can be supplied to the collector of the transistor. Hence, the collector of transistor 120 will go to a level that is essentially at ground reference. This allows divider 58 to be enabled to therefore enable the tone generation circuitry to supply drive to buffer amplifier 70. Because one end of resistor 124 is at virtual ground the voltage at node 126 is reduced and is no longer equal to VREF due to the resistor divider structure formed by resistors 124 and 128. Therefore the magnitude of the current sourced to node 80 from current mirror 74 has to drop to a lower value than required to turn on transistor 114 before transistor 114 can be shut off. This introduces hysteresis into threshold comparator 66. The operation and function of threshold comparator 66 is conventional in nature and is well understood by those skilled in the art. PNP transistor 122 is utilized to prevent the voltage at terminal 80 exceeding more than one diode voltage drop above the magnitude of the voltage VREF. This will allow threshold comparator 66 to disable the tone generator circuitry quickly after the AC ringing signal is removed in order to prevent undesirable delay in the circuit turnoff which is otherwise.

Hence, what has been described above, is a novel amplitude sense circuit which can be utilized in a telephone ringer circuit to sense when the amplitude of an AC ringing signal exceeds a predetermined value in order to provide a voltage that causes the output state of a comparator to change thereby enabling the tone generation circuit of the ringer circuit to produce a ringing tone at the output thereof.

I claim:

1. An amplitude sensing circuit for sensing when an applied input signal exceeds a predetermined threshold level to produce an output signal indicative thereof, comprising:
   current mirror means responsive to the applied input signal for producing an output current the magnitude of which is proportional to the magnitude of the current of the applied input signal;
   load means coupled to said current mirror means for producing a voltage the magnitude of which is related to the magnitude of said output current of said current mirror means; and
   comparator means for comparing said magnitude of said voltage produced by said load means with a reference voltage to produce the output signal indicative of the amplitude of the applied input signal exceeding the predetermined threshold level.

2. The sensing circuit of claim 1 wherein said current mirror means includes:
   a first current mirror circuit having an input, an output and a common terminal, said input being coupled to a first circuit node from which is sourced a first current the magnitude of which is proportional to the amplitude of the applied input signal, said common terminal being coupled to a second circuit node; and
   a second current mirror circuit having an input, an output and a common terminal, said input of said second current mirror circuit being coupled to said output of said first current mirror circuit, said common terminal of said second current mirror circuit being connected to said first circuit node from which a second current is sourced, said second current having magnitude that is proportional to said first current, said output being coupled to said load means for sourcing said output current of said current mirror means thereto.

3. The sensing circuit of claim 2 wherein said load means includes a first resistor and a first capacitor coupled in parallel between said output of said second current mirror circuit and a referenced node at which a ground reference potential is supplied.

4. A sense circuit to be used in a telephone tone ringer circuit, the ringer circuit being responsive to an applied alternating current ringing signal exceeding a predetermined threshold level for producing a tone ringing signal and including circuitry for rectifying the ringing signal and providing a current the magnitude of which varies as the amplitude of the ringing signal applied thereto, the sense circuit including:
   load circuit means responsive to a current sourced thereto for producing a direct current voltage the magnitude of which varies as the magnitude of said current sourced thereto;
   comparator means for comparing said magnitude of said direct current voltage to the magnitude of a reference voltage to produce an output signal to enable the ringer circuit to produce the tone ringing signal when said magnitude of said direct current voltage exceeds said magnitude of said reference voltage; and current mirror means responsive to the current provided by the circuitry for rectifying the ringing signal for sourcing said current to said load circuit means, said current sourced to said load circuit means from said current mirror means being proportional to the current provided by the circuitry for rectifying the ringing signal.

5. The sense circuit of claim 4 wherein said current mirror means includes:

a first current mirror circuit having an input, an output and a common terminal, said input being coupled to a first circuit node from which is sourced a portion of the current provided by the circuitry for rectifying the ringing signal to said first circuit node, said common terminal being coupled to a second circuit to which substantially all of the current sourced at said input of said first current mirror is supplied; and a second current mirror circuit having an input, an output, and a common terminal, said input being coupled to said output of said first current mirror circuit, said common terminal being connected to said first circuit node from which is sourced a portion of the current sourced to said first circuit node from the circuitry for rectifying the ringing signal and said output being coupled to said load circuit means.

6. The sense circuit of claim 5 wherein:

the magnitude of current sourced to said output of said first current mirror circuit is porportional to the magnitude of said current sourced to said input thereof; and the magnitude of current sourced from said output of said second current mirror circuit being proportional to the magnitude of the current sourced from said input thereof, said magnitude of said current sourced from said output of said second current mirror being very much less than the magnitude of said current sourced to said input of said first current mirror circuit and is proportional to the current provided from the circuitry for rectifying the ringing signal.

7. An integrated signal sense circuit receiving an rectified current at an input thereof for producing an output signal whenever the magnitude of a the current supplied thereto exceeds a predetermined threshold value, comprising:

current mirror means receiving the rectified current for diverting a very small portion thereof to an output thereof;

load means coupled to said output of said current mirror means for producing a direct current voltage, the magnitude of which is a function of the current sourced thereto from said current mirror means; and threshold comparator means for comparing said direct current voltage to a reference voltage for producing the output signal whenever said magnitude of said direct current voltage exceeds the magnitude of said reference voltage.

8. The sense circuit of claim 7 wherein said current mirror means includes:

a first current mirror circuit having an input and an output and a common terminal, said input being coupled to a first circuit node at to which the rectified current is sourced;

a second current mirror circuit having an input, an output, and a common terminal, said input being coupled to said output of said first current mirror circuit, said output being coupled to said output of said current mirror means, and said common terminal being connected to said first circuit node at to which the rectified current is sourced; and said first and second current mirror circuits causing a small portion of the rectified current sourced to said first circuit node to be diverted to said load means while sourcing the remainder of the rectified current from said common terminal of said first current mirror circuit said small portion being proportional to the total rectified current supplied to the sense circuit.

9. The sense circuit of claim 8 wherein said first current mirror circuit includes:

diode means coupled to said first circuit means between said input of said first current mirror circuit means for sinking current from said first circuit node; and transistor means connected to said diode means and between said output and said common terminal of said first current mirror circuit for sinking a predetermined magnitude of current at said output of said first current mirror circuit, said magnitude being proportional to the magnitude of current sourced through said diode means.

10. The sense circuit of claim 9 wherein said second current mirror circuit includes:

diode means coupled between said common terminal and said input of said second current mirror circuit for sourcing current to said input the magnitude of which is equal to said current sunk at said output of said first current mirror circuit; and transistor means connected to said diode means of said second current mirror circuit and between said common terminal and output thereof sourcing said current to said output the magnitude of which is proportional to said magnitude of current flowing through said diode means.

11. An integrated electronic telephone ringer circuit including rectifier circuit means for rectifying an alternating current (ac) voltage ringing signal applied thereto at inputs of the ringer circuit, circuit means for converting the rectified voltage to a rectified current, tone generation circuitry for producing a tone ringing signal at an output of the ringer circuit when enabled, and sense circuit means for enabling the tone generation circuitry when the ac voltage ringing signal exceeds a predetermined threshold level, the sense circuit including comparator circuitry for comparing the magnitude of a reference potential with the magnitude of a variable direct current voltage to produce an enabling signal to the tone generation circuit when the magnitude of the dc voltage exceeds the magnitude of the reference, the improvement comprising:

the sense circuit including current mirror means for diverting a small portion of the rectified current to a first output while the remainder of the rectified current is sourced at a second output; and load circuit means coupled to said first output of said current mirror means for producing the direct current voltage the magnitude of which varies in direct relationship to the ac ringing signal.

12. The telephone ringer circuit of claim 11 wherein said current mirror means includes:
   a first current mirror circuit having an input, an output and a common terminal, said input being coupled to a first circuit node to which the rectified current is sourced, said common terminal being connected to said second output of said current mirror means; and
   a second current mirror circuit having an input, an output and a common terminal, said input being coupled to said output of said first current mirror circuit, said output being coupled to said first output of said current mirror means and said common terminal being connected to said first circuit node.

13. The telephone ringer circuit of claim 12 wherein said load circuit means includes:
   a resistor coupled externally to the telephone ringer circuit between said output of said second current mirror circuit and ground reference potential; and
   a capacitor coupled in parallel to said resistor.

* * * * *